(12) United States Patent
Kim et al.

(10) Patent No.: US 12,409,702 B2
(45) Date of Patent: Sep. 9, 2025

(54) AIR CONDITIONING APPARATUS FOR VEHICLE

(71) Applicant: Hanon Systems, Daejeon (KR)

(72) Inventors: Yunjin Kim, Daejeon (KR); Kyung Tae Noh, Daejeon (KR); Yo Chan Min, Daejeon (KR); Sung Je Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 1228 days.

(21) Appl. No.: 17/272,074

(22) PCT Filed: Aug. 20, 2019

(86) PCT No.: PCT/KR2019/010561
§ 371 (c)(1),
(2) Date: Feb. 26, 2021

(87) PCT Pub. No.: WO2020/045878
PCT Pub. Date: Mar. 5, 2020

(65) Prior Publication Data
US 2021/0323375 A1   Oct. 21, 2021

(30) Foreign Application Priority Data

Aug. 31, 2018 (KR) .................. 10-2018-0103537
Aug. 31, 2018 (KR) .................. 10-2018-0103684
Aug. 31, 2018 (KR) .................. 10-2018-0103821

(51) Int. Cl.
*B60H 1/00* (2006.01)
*B60H 3/06* (2006.01)

(52) U.S. Cl.
CPC ..... *B60H 1/00678* (2013.01); *B60H 1/00028* (2013.01); *B60H 1/00328* (2013.01);
(Continued)

(58) Field of Classification Search
CPC ............ B60H 1/00678; B60H 1/00028; B60H 1/00328; B60H 1/00428; B60H 1/0055; B60H 3/0608; B60H 2001/00085
(Continued)

(56) References Cited

U.S. PATENT DOCUMENTS 4,531,671 A * 7/1985 Schwenk ........... B60H 1/00071
                                                    237/12.3 B
6,958,009 B2   10/2005 Shindou et al.

FOREIGN PATENT DOCUMENTS

CN      104648078 A  *  5/2015  ......... B60H 1/00207
JP      2003285620 A     10/2003
(Continued)

OTHER PUBLICATIONS

Frank, Adam, CN104648078 Translation.pdf, "Front-end module of a vehicle", May 2015, pp. 1-10.*
(Continued)

*Primary Examiner* — Avinash A Savani
*Assistant Examiner* — Ryan L Faulkner
(74) *Attorney, Agent, or Firm* — NORTON ROSE FULBRIGHT US LLP

(57) ABSTRACT

The present invention relates to an air conditioning apparatus for a vehicle and, more specifically, to an air conditioning apparatus for a heat pump system, wherein while blown air passes through a first area and a second area which are partitioned from each other by a first separation wall, air passing through the first area is cooled or heated and then supplied to the inside of a vehicle, and air passing through the second area is discharged to the outside, so that the air conditioning apparatus can be miniaturized and can easily cool or heat the inside of the vehicle.

21 Claims, 20 Drawing Sheets

(52) U.S. Cl.
CPC ....... *B60H 1/00428* (2013.01); *B60H 1/0055* (2013.01); *B60H 3/0608* (2013.01); *B60H 2001/00085* (2013.01)

(58) Field of Classification Search
USPC .......................................................... 454/69
See application file for complete search history.

(56) References Cited

FOREIGN PATENT DOCUMENTS

| | | |
|---|---|---|
| JP | 2008155827 A | 7/2008 |
| JP | 2012122716 A | 6/2012 |
| JP | 2015101333 A | 6/2015 |
| KR | 10-2009-0063402 A | 6/2009 |
| KR | 10-1251206 B1 | 3/2013 |
| KR | 10-2017-0018995 A | 2/2017 |
| KR | 10-2017-0035481 A | 3/2017 |
| KR | 10-2017-0086725 A | 7/2017 |

OTHER PUBLICATIONS

Satoshi, Ajisaka, CN101421125 Translation.pdf, "Vehicular air-conditioner device", Apr. 2009, pp. 1-27.*

Lee, Cap, KR20170035481 Translation.pdf, "Air purification system for vehicle", Mar. 2017, pp. 1-18.*

Office Action issued on Dec. 23, 2023 by the CIPO in the corresponding Patent Application No. 201980056463.0, with English translation.

* cited by examiner (a)

(b)

(a)

(b)

(a)

(b)

AIR CONDITIONING APPARATUS FOR VEHICLE

This application is a national phase under 35 U.S.C. § 371 of International Application No. PCT/KR2019/010561 filed Aug. 20, 2019, which claims the benefit of priority from Korean Patent Application Nos. 10-2018-0103537 filed on Aug. 31, 2018, 10-2018-0103684 filed on Aug. 31, 2018 and 10-2018-0103821 filed on Aug. 31, 2018. The entire contents of these applications are incorporated herein by reference in their entirety.

TECHNICAL FIELD

The disclosure relates to an air conditioning apparatus for a vehicle and, more particularly, to an air conditioning apparatus for a vehicle, in which while blown air passes through a first area and a second area which are partitioned from each other by a first separation wall, air passing through the first area is cooled or heated and then supplied to the inside of a vehicle, and air passing through the second area is discharged to the outside, and the air conditioning apparatus may thus be miniaturized and may easily cool or heat the inside of the vehicle.

BACKGROUND ART

A general air conditioner system for a vehicle may include a compressor compressing and delivering a refrigerant, a condenser condensing the high-pressure refrigerant delivered from the compressor, an expansion member throttling the liquefied refrigerant condensed in the condenser, and an evaporator evaporating the low-pressure liquid refrigerant throttled by the expansion member through heat-exchange with air blown to the inside of the vehicle, thereby cooling air discharged to the inside using heat absorption by evaporative latent heat of the refrigerant, which are connected to one another through a refrigerant pipe.

The evaporator may be installed in an air conditioning case installed on the inside the vehicle to serve a cooling function. That is, air blown by a blower may pass through the evaporator and may be cooled by the evaporative latent heat of the liquid refrigerant circulated in the evaporator and discharged to the inside of the vehicle in a cold state.

In addition, heating the inside of the vehicle may use a heater core installed in the air conditioning case and circulating engine coolant, or an electric heating type heater installed in the air conditioning case.

Meanwhile, the condenser may be installed on the front side of the vehicle to dissipate heat while exchanging the heat with air.

In recent years, a heat pump system performing cooling and heating using only a refrigeration cycle has been developed, in which a cool air passage 11 and a hot air passage 12 are formed to be partitioned in one air conditioning case 10, an evaporator 4 cooling the air is installed in the cool air passage 11, and a condenser 2 heating the air is installed in the hot air passage 12 as shown in FIG. 1. Here, an air discharge port 15 supplying air to the inside of the vehicle and an air outlet port 16 discharging air to the outside of the vehicle may be formed at the outlet side of the air conditioning case 10. In addition, blowers 20 operated individually from each other may be respectively installed on the inlet side of the cool air passage 11 and the hot air passage 12.

In a cooling mode, cool air cooled while passing through the evaporator 4 of the cool air passage 11 may thus be discharged to the inside of the vehicle through the air discharge port 15 to cool the inside of the vehicle. Here, hot air heated while passing through the condenser 2 of the hot air passage 12 may be discharged to the outside of the vehicle through the air outlet port 16.

In a heating mode, the hot air heated while passing through the condenser 2 of the hot air passage 12 may be discharged to the inside of the vehicle through the air discharge port 15 to heat the inside of the vehicle. Here, the cool air cooled while passing through the evaporator 4 of the cool air passage 11 may be discharged to the outside of the vehicle through the air outlet port 16.

However, the prior art has an increased overall size inevitably because each air outlet port 16 having an adjusting door is required to be formed in two positions as the blowers 20 are respectively positioned in the cool air passage 11 and the hot air passage 12, and one of the air passing through the condenser 2 and the evaporator 4 needs to be discharged through the air outlet port.

In addition, the condenser 2 installed in the air conditioning case is required to have a small size, and may thus have a low condensing performance and a problematic cooling performance.

PRIOR ART DOCUMENT

Patent Document

Korean Patent Publication No. 10-1251206 (Mar. 29, 2013)

DISCLOSURE

Technical Problem

An object of the present disclosure is to provide an air conditioning apparatus for a vehicle, in which while blown air passes through a first area and a second area which are partitioned from each other by a first separation wall, air passing through the first area is cooled or heated and then supplied to the inside of a vehicle, and air passing through the second area is discharged to the outside, and the air conditioning apparatus may thus be miniaturized and may easily cool or heat the inside of the vehicle.

In more detail, an object of the present disclosure is to provide an air conditioning apparatus for a vehicle, in which: air is simultaneously blown to the first area and the second area by one blower; the first area communicates with the inside of the vehicle, and an evaporator and an internal heat exchanger are installed on the inside to cool and heat the inside; and the second area communicates with the outside, the heat exchanger is installed on the inside, and discarded air passing through the heat exchanger by cooling and heating settings is discharged to the outside without a separate door, thereby having a small size.

In addition, another object of the present disclosure is to provide an air conditioning apparatus for a vehicle, which is installed in the mounting hole of a dash panel, is more easily mounted by having the evaporator, the heat exchanger and the blower installed in an engine room side in the air conditioning case and by having the internal heat exchanger disposed on the inside of the vehicle, and effectively utilizes a space in the engine room.

In addition, another object of the present disclosure is to provide an air conditioning apparatus for a vehicle, in which outside air or inside air is selectively supplied to the first area through a first adjusting door of the air conditioning case, and the outside air is supplied to the second area through a second adjusting door.

Here, another object of the present disclosure is to provide an air conditioning apparatus for a vehicle, in which an engine room air inlet is formed to be opened and closed so that air in the engine room is introduced through the second adjusting door, and during maximum heating, air in the engine room, which has a higher temperature than the outside, is used to increase an evaporation performance (heat absorption amount) of the heat exchanger, thereby further enhancing a heating performance of the internal heat exchanger.

In addition, another object of the present disclosure is to provide an air conditioning apparatus for a vehicle, in which an auxiliary inside-air inlet hole additionally supplying the inside air to the second area and a third adjusting door adjusting its flow are formed, and during the maximum heating, the inside warm air is used to further enhance the evaporation performance of the heat exchanger.

In addition, another object of the present disclosure is to provide an air conditioning apparatus for a vehicle, in which an auxiliary heating heat exchanger is additionally installed behind the internal heat exchanger, thereby securing a faster and more effective heating performance.

Technical Solution

In one general aspect, an air conditioning apparatus for a vehicle, includes: an air conditioning case 110 including a first area A1 which communicates with the inside of the vehicle and in which inside-air conditioning wind flows and a second area A2 which communicates with the outside of the vehicle; and a blower 160 which blows the wind to the first area A1 and the second area A2.

In addition, the blower 160 may be a blower operated by one motor, and the wind may be blown to the first area A1 and the second area A2 by the blower.

In addition, the air conditioning apparatus 1000 for a vehicle may include an evaporator 130 for a cooling and an internal heat exchanger 120 for a heating in the first area A1 of the air conditioning case 110.

In addition, the air conditioning apparatus 1000 for a vehicle may include a heat exchanger 140 installed in the second area A2 of the air conditioning case 110 to condense a refrigerant during the cooling and to evaporate the refrigerant during the heating.

In addition, when wind passing through the first area A1 is cold wind for the cooling, wind passing through the second area A2 may be wind having a higher temperature than the cold wind.

In addition, when the wind passing through the first area A1 is warm wind for the heating, the wind passing through the second area A2 may be wind having a lower temperature than the warm wind.

In addition, the air conditioning case 110 may include: a first outside-air inlet 114a into which outside air is introduced and an inside-air inlet 116 into which inside air is introduced, which is each formed by making a certain area of the air conditioning case 110 hollow; a first adjusting door 191 adjusting openings and closings of the first outside-air inlet 114a and the inside-air inlet 116; a second outside-air inlet 114b which is formed in the second area A2 of the air conditioning case 110 and into which the outside air is introduced; and a second adjusting door 192 adjusting opening and closing of the second outside-air inlet 114b.

In addition, the air conditioning case 110 may include an engine room air inlet 115 which is formed by making a certain area hollow to allow the air in the engine room to be introduced into the second area A2, and opening and closing of which is adjusted by the second adjusting door 192.

In addition, the air conditioning case 110 may include an auxiliary inside-air inlet hole 118 which is formed by making a certain area hollow to allow the inside air to be introduced into the second area A2, and opening and closing of which is adjusted by a third adjusting door 193.

In addition, the auxiliary inside-air inlet hole 118 may be formed by making a certain area of a partition wall 110w adjacent to the inside-air inlet 116 hollow, and some of the air introduced into the first area A1 through the inside-air inlet 116 may be moved to the second area A2 through the auxiliary inside-air inlet hole 118. Here, the third adjusting door 193 may have the shape of a sliding door.

In addition, during maximum heating, the second adjusting door 192 may block the second outside-air inlet 114b and open the engine room air inlet 115 to introduce the air in the engine room, and the third adjusting door 193 may open the auxiliary inside-air inlet hole 118 to introduce some of the inside air.

In addition, the air conditioning case 110 may further include a filter 180 installed behind the first adjusting door 191 and the second adjusting door 192 in an air flow direction.

In addition, the air conditioning apparatus 100 for a vehicle of the present disclosure may further include an auxiliary heating heat exchanger 170 installed behind the internal heat exchanger 120 in the air flow direction.

In addition, in the air conditioning apparatus 100 for a vehicle, the blower 160 may be one component, and simultaneously blow air to the first area A1 and the second area A2.

In addition, an air outlet 117 through which air in the second area A2 is discharged to the outside may be formed in the air conditioning case 110, and the heat exchanger 140 may be installed adjacent to the air outlet 117 installed behind the blower 160 in the air flow direction.

In addition, based on a dash panel 2000 partitioning the inside of the vehicle and the engine room from each other, the evaporator 130, the heat exchanger 140 and the blower 160 may be installed in the engine room side in the air conditioning case 110.

Advantageous Effects

As set forth above, the present disclosure may provide the air conditioning apparatus for a vehicle, in which while blown air passes through a first area and a second area which are partitioned from each other by a first separation wall, air passing through the first area is cooled or heated and then supplied to the inside of a vehicle, and air passing through the second area is discharged to the outside, so that the air conditioning apparatus may be miniaturized and may easily cool or heat the inside of the vehicle.

In more detail, the present disclosure may provide the air conditioning apparatus for a vehicle, in which: one blower simultaneously blows air to the first area and the second area; the first area communicates with the inside of the vehicle, and the evaporator and the internal heat exchanger are installed on the inside to cool and heat the inside; and the second area communicates with the outside, the heat exchanger is installed on the inside, and discarded air passing through the heat exchanger by the cooling and heating settings is discharged to the outside without a separate door, thereby having a small size.

In addition, the present disclosure may provide the air conditioning apparatus for a vehicle, which is installed in the mounting hole of the dash panel, more easily mounted by having the evaporator, the heat exchanger and the blower installed in the engine room side in the air conditioning case and by having the internal heat exchanger disposed on the inside of the vehicle, and effectively utilizes the space in the engine room.

In addition, the present disclosure may provide the air conditioning apparatus for a vehicle, in which the outside air or the inside air is selectively supplied to the first area through the first adjusting door of the air conditioning case, and the outside air is supplied to the second area through the second adjusting door.

Here, the present disclosure may provide the air conditioning apparatus for a vehicle, in which the engine room air inlet is formed to be opened and closed so that air in the engine room is introduced through the second adjusting door, and during the maximum heating, the air in the engine room, which has a higher temperature than the outside, is used to enhance the evaporation performance (heat absorption amount) of the heat exchanger, thereby further enhancing the heating performance of the internal heat exchanger.

In addition, the present disclosure may provide the air conditioning apparatus for a vehicle, in which the auxiliary inside-air inlet hole additionally supplying the inside air to the second area and the third adjusting door adjusting its flow are formed, and during the maximum heating, the inside warm air is used to further enhance the evaporation performance of the heat exchanger.

In addition, the present disclosure may provide the air conditioning apparatus for a vehicle, in which the auxiliary heating heat exchanger is additionally installed behind the internal heat exchanger, thereby securing the faster and more effective heating performance.

DESCRIPTION OF DRAWINGS

FIGS. 10 through 12B are views each showing a state in which the air conditioning apparatus for a vehicle heats air according to the present disclosure.

*Description of Reference Numerals*

Figure 1:
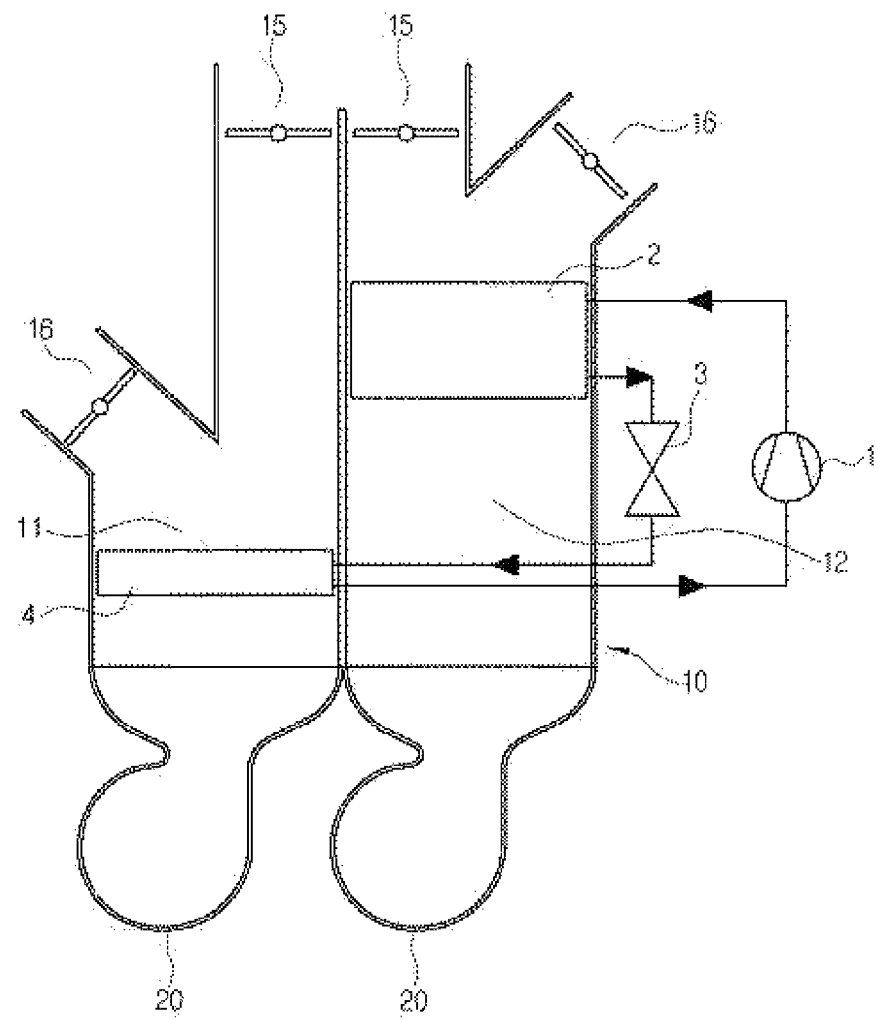
FIG. 1 is a view showing a conventional vehicle heat pump system.

| | | | |
|---|---|---|---|
| 1000: | heat pump system | | |
| L1: | refrigerant circulation line, | L2: | coolant circulation line |
| L3: | bypass line, | V: | non-return valve |
| 100: | air conditioning apparatus | | |
| A1: | first area, | A2: | second area |
| 110: | air conditioning case, | 110w: | partition wall |
| 110d: | temp door | | |
| 111: | face vent, | 111d: | face vent door |
| 112: | defrost vent, | 112d: | defrost vent door |
| 113: | floor vent, | 113d: | floor vent door |
| 114a: | first outside-air inlet, | 114b: | second outside-air inlet |
| 115: | engine room air inlet | | |
| 116: | inside-air inlet | | |
| 117: | air outlet | | |
| 118: | auxiliary inside-air inlet hole | | |
| 120: | internal heat exchanger | | |
| 130: | evaporator | | |
| 140: | heat exchanger | | |
| 150: | second expansion member | | |
| 160: | blower | | |
| 170: | auxiliary heating heat exchanger | | |
| 180: | filter | | |
| 191: | first adjusting door, | 192: | second adjusting door |
| 193: | third adjusting door | | |
| 200: | compressor | | |
| 300: | first expansion member | | |
| 400: | water-cooled condenser, | 410: | gas-liquid separator |
| 510: | blocking plate | | |
| 520: | extension portion | | |
| 530: | guide portion | | |
| P1: | engine room air inlet passage | | |
| P2: | inner passage of second area | | |
| 2000: | dash panel, | 2100: | mounting hole |
| 2200: | inside-air introduction hollow portion | | |
| 3000: | radiator | | |
| 4000: | cooling fan | | |
| 5000: | coolant pump | | |

BEST MODE

Hereinafter, an air conditioning apparatus 100 for a vehicle of the present disclosure having the above-described configuration is described in detail with reference to the accompanying drawings.

The air conditioning apparatus 100 for a vehicle of the present disclosure is an air conditioning apparatus 100 used for a heat pump system 1000 installed in the vehicle. The description below will again describe the heat pump system 1000 including a compressor 200, a heat exchanger 140, expansion members 300 and 150, an evaporator 130 and an internal heat exchanger 120, which are connected to one another by a refrigerant circulation line L1.

Figure 2:
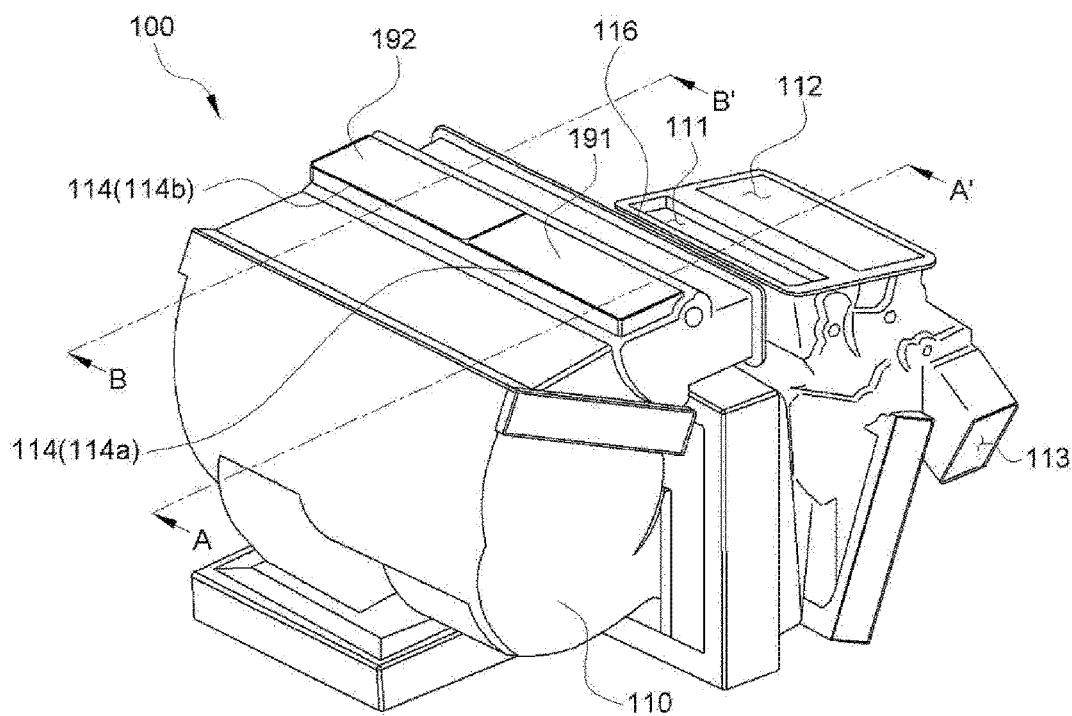
FIGS. 2 through 4 are a perspective view, a cross-sectional view in direction AA' and a cross-sectional view in direction BB', each showing an air conditioning apparatus for a vehicle according to the present disclosure.
Figure 3:
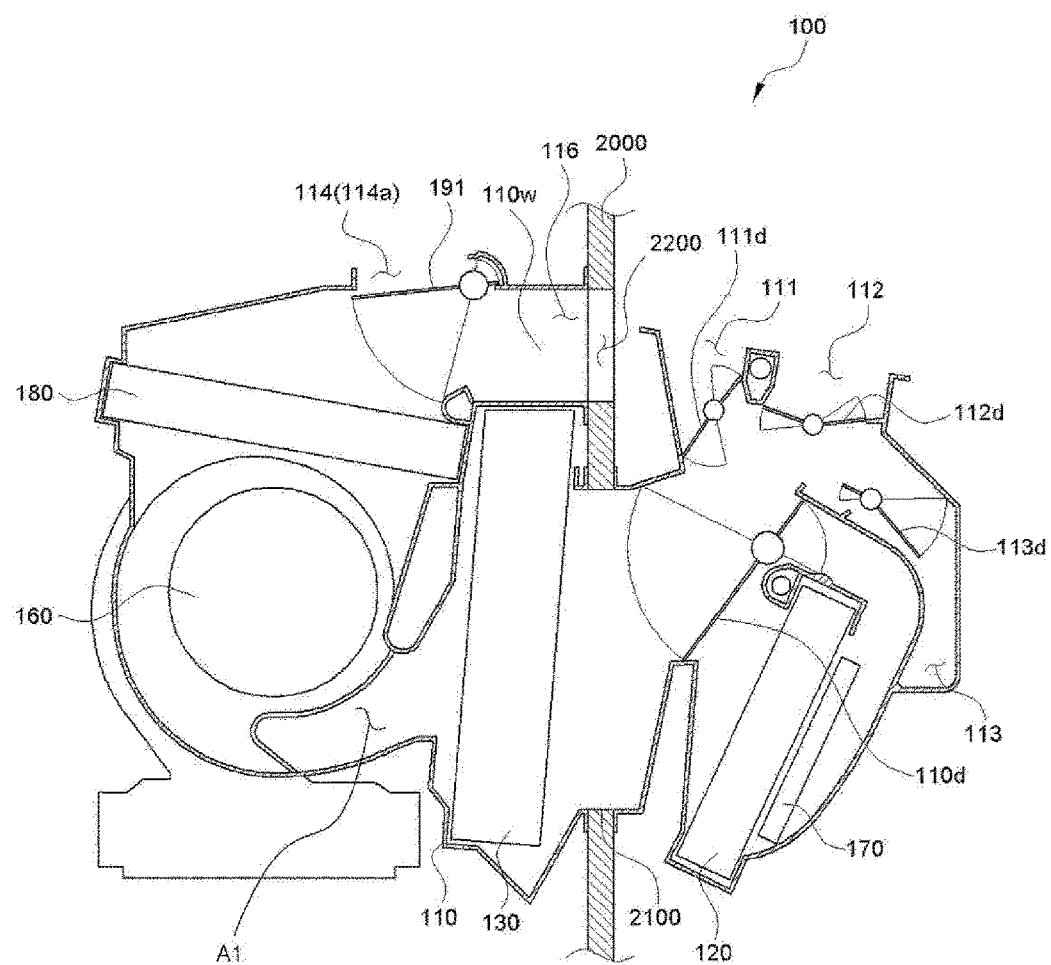
Figure 4:
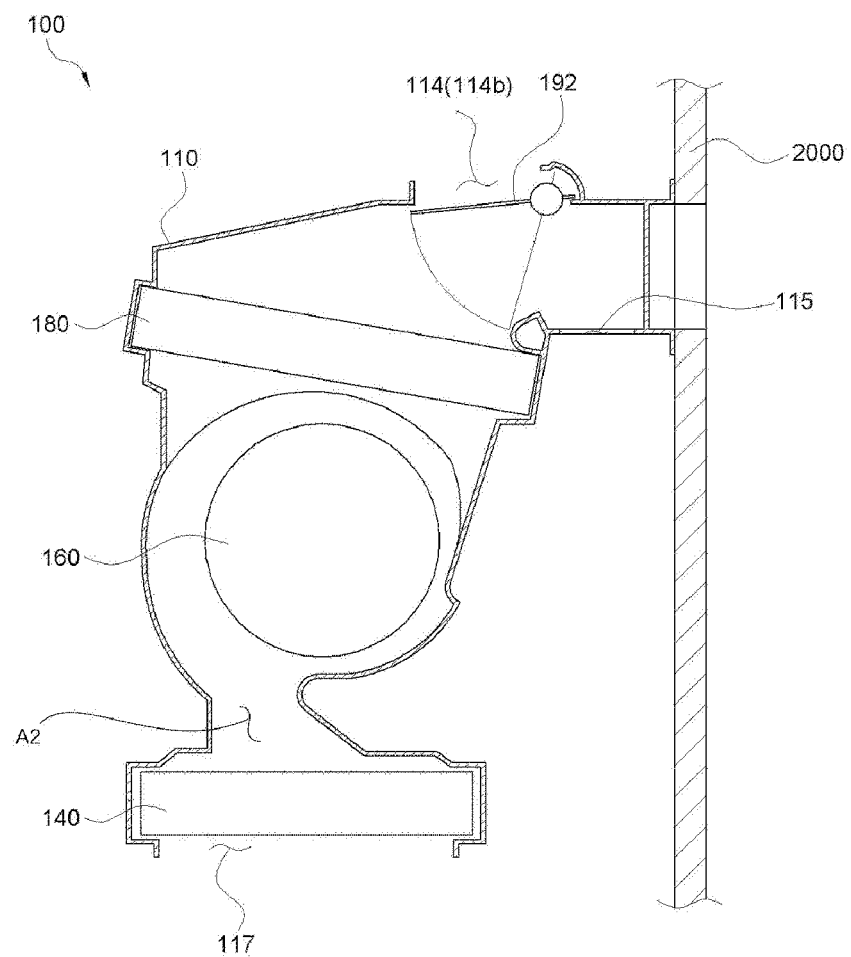

FIGS. 2 through 4 are a perspective view, a cross-sectional view in direction AA' and a cross-sectional view in direction BB', each showing an air conditioning apparatus for a vehicle according to the present disclosure.

The air conditioning apparatus 100 for a vehicle of the present disclosure may include an air conditioning case 110, a blower 160, an evaporator 130, an internal heat exchanger 120 and a heat exchanger 140.

The air conditioning case 110 may be a basic body forming the air conditioning apparatus 100 for a vehicle of the present disclosure, and may have the other components built therein, and may have a first area A1 and a second area A2 partitioned from each other by a partition wall 110w in a width direction of the vehicle. Here, the first area A1 and the second area A2 may be partitioned from each other by the partition wall 110w so that air is introduced thereinto and moved thereto. The air introduced into the first area A1 may be cooled or heated to cool or heat the inside of a vehicle, and the air introduced into the second area A2 may communicate with the outside and may be discarded to the outside.

In the air conditioning case 110, a first outside-air inlet 114a and an inside-air inlet 116 may be formed on a portion into which the air in the first area A1 is introduced, a temp door 110d mixing the air passing through the evaporator 130 and the internal heat exchanger 120 based on a set temperature may be built therein, and vents 111, 112 and 113 through which air is discharged to the inside of a vehicle are formed on a portion to which the air in the first area A1 is discharged. Due to a dash panel 2000 partitioning the inside of the vehicle and the engine room from each other, a certain area of the air conditioning case 110 may be disposed on an engine room, and the other area may be disposed on the inside of the vehicle. A portion on which the vents 111, 112 and 113 are formed by passing through a mounting hole 2100 of the dash panel 2000 may be positioned on the inside of the vehicle. In more detail, in the air conditioning apparatus 100 for a vehicle of the present disclosure, the evaporator 130, the heat exchanger 140 and the blower 160 may be installed in the engine room side in the air conditioning case 110.

The first outside-air inlet 114a is a portion which is formed by making the certain area of the air conditioning case 110 hollow and into which outside air is introduced, and the inside-air inlet 116 may be a portion which is made hollow to communicate with an inside-air introduction hollow portion 2200 of the dash panel 2000 and into which air inside the vehicle is introduced. Here, a first adjusting door 191 may adjust air flows in the first outside-air inlet 114a and the inside-air inlet 116.

In addition, the portion to which the air in the first area A1 is discharged may include the face vent 111, the floor vent 113 and the defrost vent 112 whose opening degrees are respectively adjusted by doors 111, 112d and 113d.

Meanwhile, in the air conditioning case 110, a second outside-air inlet 114b may be formed on a portion into which air in the second area A2 is introduced, and an air outlet 117 through which air is discharged to the outside may be formed on a portion to which the air in the second area A2 is discharged. That is, all air introduced into the second area A2 may be discharged, and the air outlet 117 needs not to have a separate door to adjust its flow.

The second outside-air inlet 114b may be a portion into which the outside air is introduced by a certain hollow area of the air conditioning case 110, and may preferably be formed to be parallel to the first outside-air inlet 114a. Here, a second adjusting door 192 may adjust the air flow in the second outside-air inlet 114b.

In addition, the air conditioning apparatus 100 for a vehicle of the present disclosure may further include an engine room air inlet 115 formed to be hollow. The engine room air inlet 115 may be a portion which is formed by making a certain area of the air conditioning case 110 hollow to allow air in the engine room to be introduced into the second area A2, and the second adjusting door 192 may adjust the flow of the outside air or the air in the engine room to be selectively introduced into the second area A2.

In winter, when an outside temperature is low, the inside of the engine room may be heated by the operations of various electrical components and may thus maintain a higher temperature than the outside temperature. During maximum heating, the heat pump system 1000 of the present disclosure may supply the air in the engine room to the second area A2 through the second adjusting door 192 to enhance an evaporation performance (heat absorption amount) of the heat exchanger 140, thereby further enhancing a heating performance of the internal heat exchanger 120.

In addition, in the air conditioning case 110, it is preferable that the portion into which the air is introduced extends to correspond to the inside-air introduction hollow portion 2200 of the dash panel 2000, which is made hollow to introduce the inside air thereinto, and the first outside-air inlet 114a and the second outside-air inlet 114b are formed on an upper side of the extending portion, and the engine room air inlet 115 is formed on a lower side of the extending portion.

That is, in the portion of the air conditioning case 110, into which the air is introduced, the inside-air inlet 116 may be made hollow in a direction toward the dash panel 2000, the first outside-air inlet 114a and second outside-air inlet 114b may be made hollow on the upper side, the engine room air inlet 115 may be formed on the lower side, the first outside-air inlet 114a and inside-air inlet 116 of the first area A1 may each have an opening degree adjusted by the first adjusting door 191, and the second outside-air inlet 114b and engine room air inlet 115 of the second area A2 may each have an opening degree adjusted by the second adjusting door 192.

Figure 5:
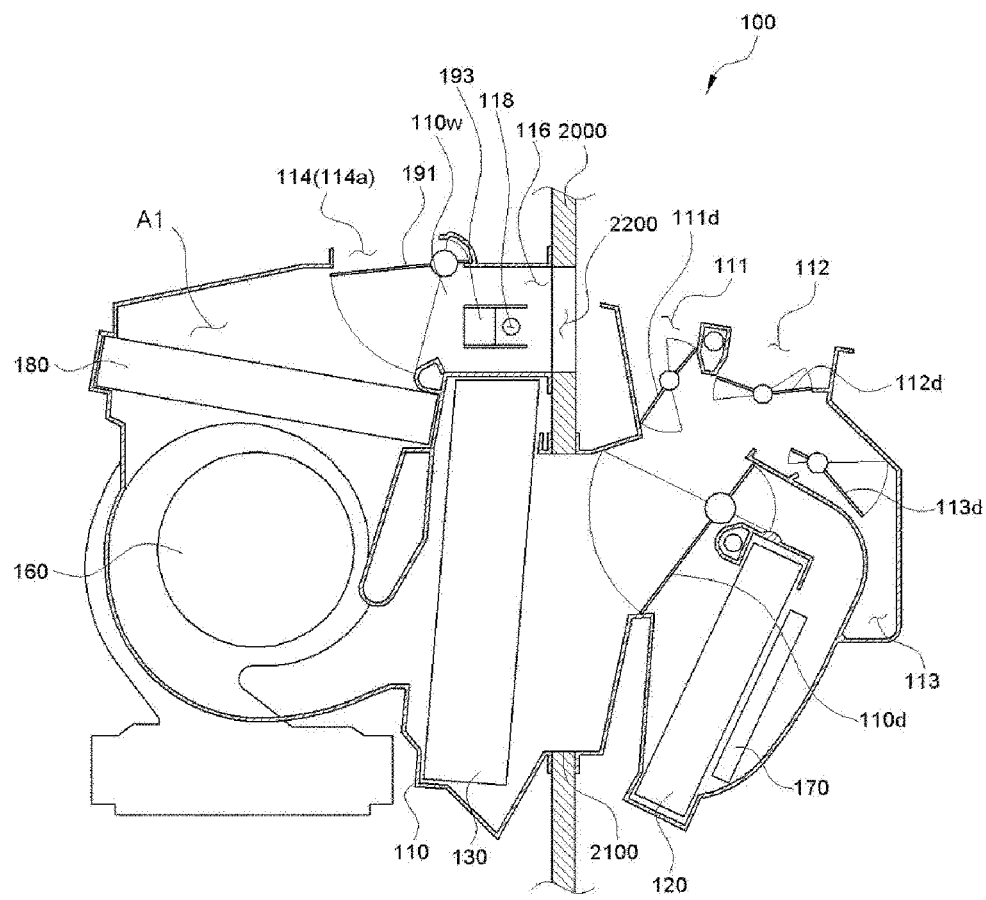
FIG. 5 is a view showing another example of the air conditioning apparatus for a vehicle according to the present disclosure.
Figure 6:
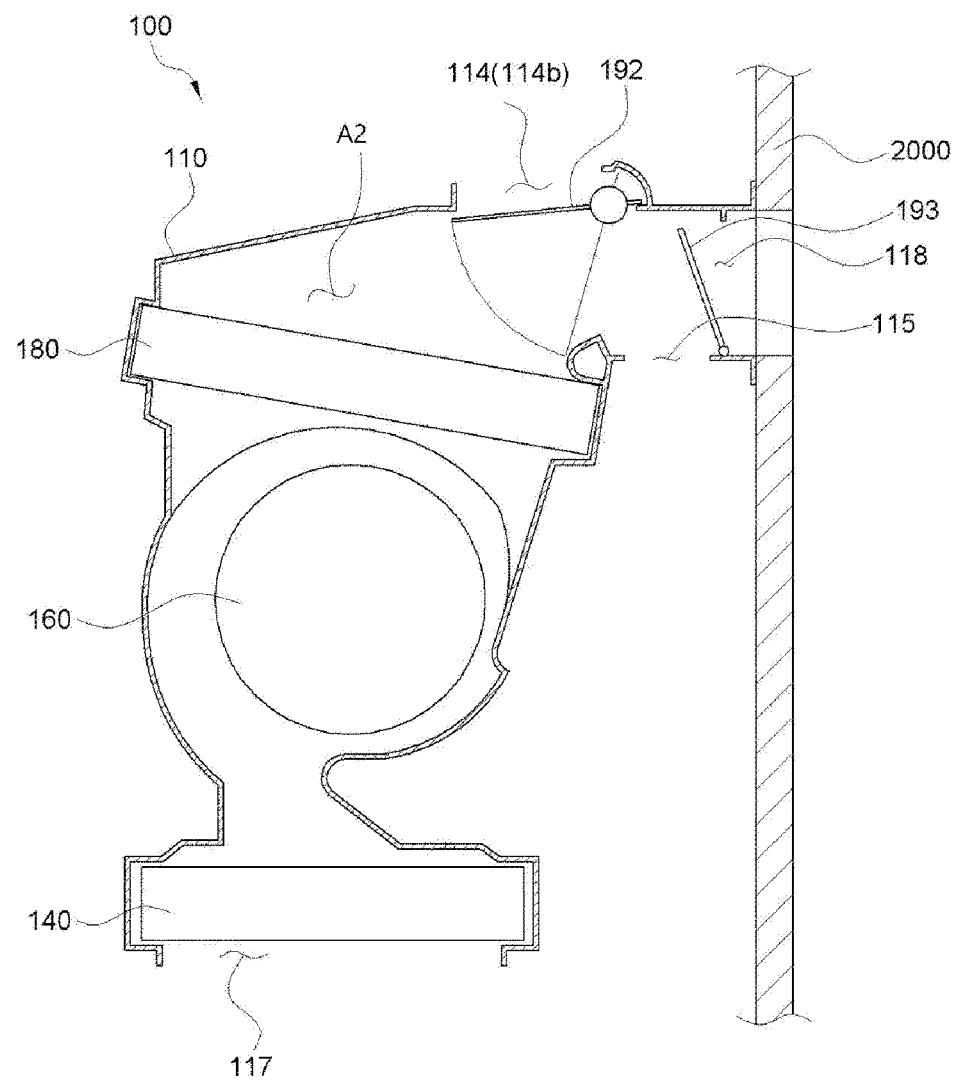
FIG. 6 is a view showing another example of the air conditioning apparatus for a vehicle according to the present disclosure.

Meanwhile, FIG. 5 is a view showing another example of the air conditioning apparatus 100 for a vehicle according to the present disclosure; and FIG. 6 is a view showing another example of the air conditioning apparatus 100 for a vehicle according to the present disclosure. The air conditioning apparatus 100 for a vehicle of the present disclosure may allow inside air to be additionally introduced into the second area A2 to further enhance the heating performance. The air conditioning case 110 may include an auxiliary inside-air inlet hole 118 which is formed by making a certain area hollow to allow the inside air to be introduced into the second area A2, and opening and closing of which is adjusted by a third adjusting door 193.

FIG. 5 shows a shape of the auxiliary inside-air inlet hole 118 which is formed by making a certain area of the partition wall 110w hollow, and some of the air introduced into the first area A1 through the inside-air inlet 116 may be moved to the second area A2 through the auxiliary inside-air inlet hole 118. When the auxiliary inside-air inlet hole 118 is formed in the partition wall 110w, the third adjusting door 193 may preferably have the shape of a sliding door.

FIG. 6 shows an example in which the auxiliary inside-air inlet hole 118 is formed by making a certain area of the wall facing the inside-air introduction hollow portion of the dash panel 2000 hollow, and a lower side of the third adjusting door 193 is pivoted as a central axis to open and close the auxiliary inside-air inlet hole 118.

During maximum heating, the second adjusting door 192 may block the second outside-air inlet 114b and open the engine room air inlet 115 to introduce the air in the engine room into the second area A2, and the third adjusting door 193 may open the auxiliary inside-air inlet hole 118 to introduce some of the inside air. That is, when heating the inside of the vehicle, the air conditioning apparatus 100 for a vehicle of the present disclosure may further enhance its heating performance because the air in the engine room and inside air having a higher temperature than the outside air are supplied to the second area A2.

The blower 160 may be installed in the air conditioning case 110 to blow air to the first area A1 and the second area A2. In the present disclosure, the blower 160 may be one component, and operated by one motor. Through this configuration, the blower 160 may simultaneously blow air to the first area A1 and the second area A2.

The evaporator 130 may be installed in the first area A1 in the air conditioning case 110 to cool air discharged to the inside of the vehicle. All air introduced into the first area A1 may pass through the evaporator 130, and when cooling is performed, a low-temperature, low-pressure, wet-saturated refrigerant may be supplied to the evaporator 130 and air may thus be cooled while passing through the evaporator 130 and discharged to the inside of the vehicle. In addition, when heating is performed, the refrigerant is not supplied to the evaporator 130, and the temperature is not changed even though air passes through the evaporator 130.

The internal heat exchanger 120 may be installed behind the evaporator 130 in the first area A1 in the air conditioning case 110 to heat the air discharged to the inside of the vehicle. That is, the internal heat exchanger 120 is a component performing the heating, and the temp door 110d may adjust the cooling and the heating by adjusting the flow through which the air in the second area A2 passes through the internal heat exchanger 120.

In addition, the air conditioning apparatus 100 for a vehicle of the present disclosure may further include an auxiliary heating heat exchanger 170 installed behind the internal heat exchanger 120 in an air flow direction. The auxiliary heating heat exchanger 170 may perform the heating together with the internal heat exchanger 120, and may use various forms including a positive temperature coefficient (PTC) heating member.

The heat exchanger 140 may be installed in the second area A2 in the air conditioning case 110 to condense the refrigerant based on a cooling setting or to evaporate the refrigerant based on a heating setting. That is, the heat exchanger 140 does not cool or heat air for actual cooling and heating, but may condense the refrigerant supplied to the evaporator 130 based on the cooling setting or evaporate the refrigerant supplied to the internal heat exchanger 120 based on the heating setting. The description below will again describe the flow of the refrigerant based on the cooling and heating settings of the actual heat pump system 1000 and the change in the refrigerant as the refrigerant passes through each component.

In addition, the heat exchanger 140 may be installed adjacent to the air outlet 117 installed behind the blower in the air flow direction. In addition, the air introduced into the second area A2 through the blower 160 may pass through the heat exchanger 140, and all of the air may then be discharged to the outside through the air outlet 117.

That is, the evaporator 130 for the cooling and the internal heat exchanger 120 for the heating may be installed in the first area A1 of the air conditioning case 110, and the heat exchanger 140 condensing the refrigerant during the cooling and evaporating the refrigerant during the heating may be installed in the second area A2. Here, when wind passing through the first area A1 is cold wind for the cooling, wind passing through the second area A2 may be wind having a higher temperature than the cold wind, and when the wind passing through the first area A1 is warm wind for the heating, the wind passing through the second area A2 may be wind having a lower temperature than the warm wind.

In addition, the air conditioning apparatus 100 for a vehicle of the present disclosure may further include a filter 180 installed behind the first adjusting door 191 and the second adjusting door 192 in the air flow direction, and the filter 180 may be a replaceable type.

Figure 7:
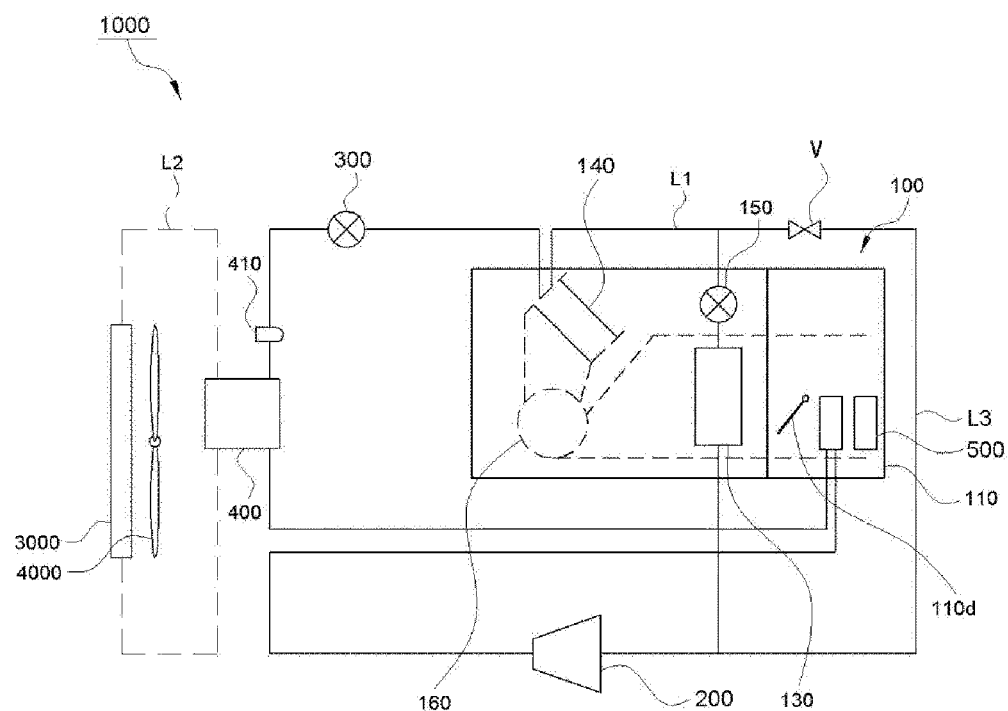
FIG. 7 is a view showing an example in which the air conditioning apparatus according to the present disclosure is applied to the vehicle heat pump system.

FIG. 7 is a view showing an example in which the air conditioning apparatus 100 according to the present disclosure is applied to the vehicle heat pump system 1000, and the air conditioning apparatus 100 of the present disclosure may be used for the heat pump system 1000.

The heat pump system 1000 may include the compressor 200, the first expansion member 300 and the second expansion member 150 in addition to the internal heat exchanger 120, the evaporator 130, the heat exchanger 140 and the blower 160, as described above.

First, the compressor 200 may be installed on the refrigerant circulation line L1 through which the refrigerant is circulated to compress and discharge the refrigerant.

The internal heat exchanger 120 may be installed in the air conditioning case 110 to exchange heat between air in the air conditioning case 110, i.e. air conditioning wind and the refrigerant discharged from the compressor 200, and supply the heated air conditioning wind to the inside as a result of the condensation to perform the heating.

The evaporator 130 may be installed in the air conditioning case 110 to exchange heat between the air in the air conditioning case 110 and the refrigerant supplied to the compressor 200, and evaporate the low-pressure liquid refrigerant to heat the air supplied to the inside, thereby performing the cooling.

The heat exchanger 140 may be installed in the air conditioning case 110 to exchange heat between the refrigerant circulated in the refrigerant circulation line L1 and the air. The heat exchanger 140 may condense the refrigerant during the cooling or evaporate the refrigerant during the heating.

The first expansion member 300 may be installed on the refrigerant circulation line L1 at the outlet side of the internal heat exchanger 120 to selectively expand the refrigerant discharged from the internal heat exchanger 120, and during the heating, the first expansion member 300 may be operated to condense the refrigerant in the internal heat exchanger 120 and to evaporate the refrigerant from the heat exchanger 140, thereby throttling the refrigerant to have a low temperature and a low pressure. In addition, during the cooling, the first expansion member 300 does not throttle the refrigerant but may bypass the refrigerant.

The second expansion member 150 may be installed on the refrigerant circulation line L1 at the inlet side of the evaporator 130 to expand the refrigerant supplied to the evaporator 130. During the cooling, the second expansion member 150 may throttle the refrigerant condensed while passing through the heat exchanger 140 to have the low temperature and the low pressure and then supply the refrigerant to the evaporator 130. In addition, during the heating, the second expansion member 150 does not throttle the refrigerant but may bypass the refrigerant.

In addition, the vehicle heat pump system 1000 may further include a water-cooled condenser 400 installed on the refrigerant circulation line L1 at the inlet side of the first expansion member 300 outside the air conditioning case 110 to exchange heat with a coolant cooling a battery. During the cooling, the water-cooled condenser 400 is a portion in which the coolant flows along a coolant circulation line L2 to perform the heat exchange, and may condense the refrigerant supplied to the evaporator 130 together with the internal heat exchanger 120 and the heat exchanger 140 based on the cooling setting. A radiator 3000 cooling the coolant and a coolant pump 5000 circulating the coolant may be installed on the coolant circulation line L2, and a cooling fan 4000 blowing air to the radiator 3000 may be installed adjacent to the radiator 3000. The water-cooled condenser 400 may include a gas-liquid separator 410. In this case, the refrigerant may be condensed by the water-cooled condenser 400 and the liquid refrigerant separated by the gas-liquid separator 410 may be overcooled by the heat exchanger 140. Therefore, it is possible to enhance the cooling performance of the evaporator 130 by enhancing its condensing performance.

In addition, the vehicle heat pump system 1000 may have a bypass line L3 formed on the refrigerant circulation line L1 to bypass the second expansion member 150 and the evaporator 130, and a non-return valve V may be additionally installed on the bypass line L3 to prevent reverse flow of the refrigerant. During the heating, on the bypass line L3, the refrigerant does not pass through the second expansion member 150 or the evaporator 130, but may pass through the heat exchanger 140 to be supplied to the compressor 200. That is, it is possible to omit unnecessary components (second expansion member 150 and evaporator 130) during the heating to prevent unnecessary flow rate decrease and pressure drop.

Figure 8:
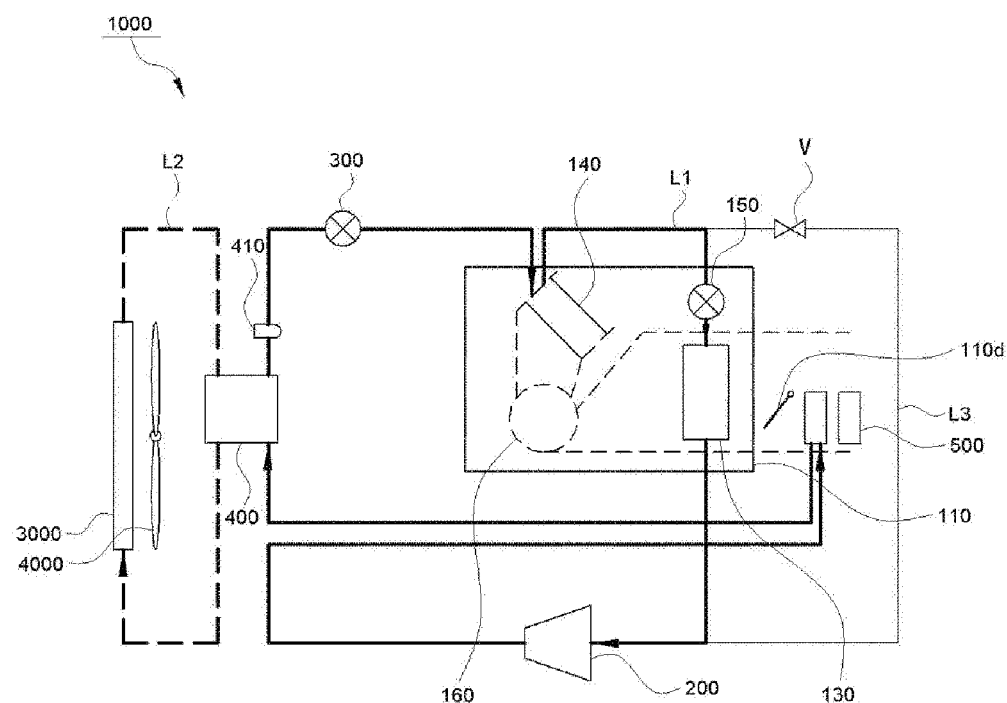
FIGS. 8, 9A and 9B are views each showing a state in which the air conditioning apparatus for a vehicle cools air according to the present disclosure.
Figure 9:
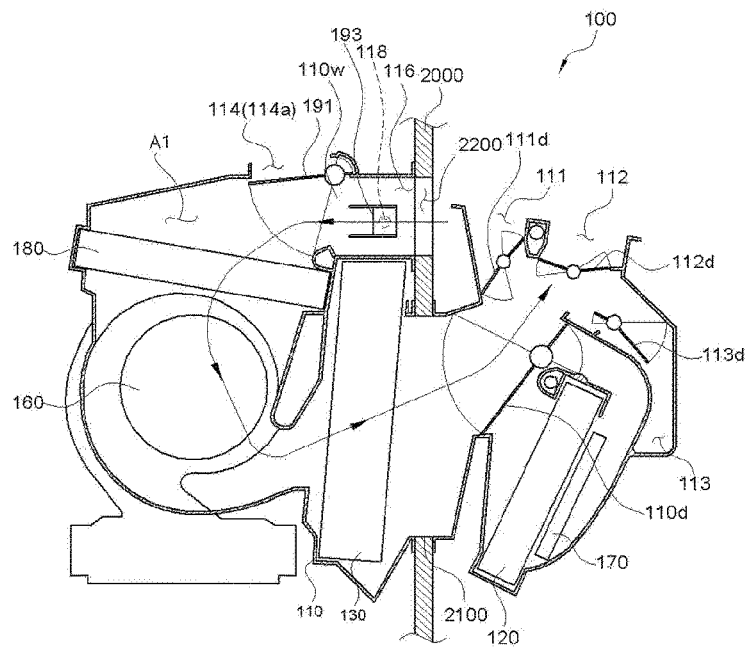
Figure 9:
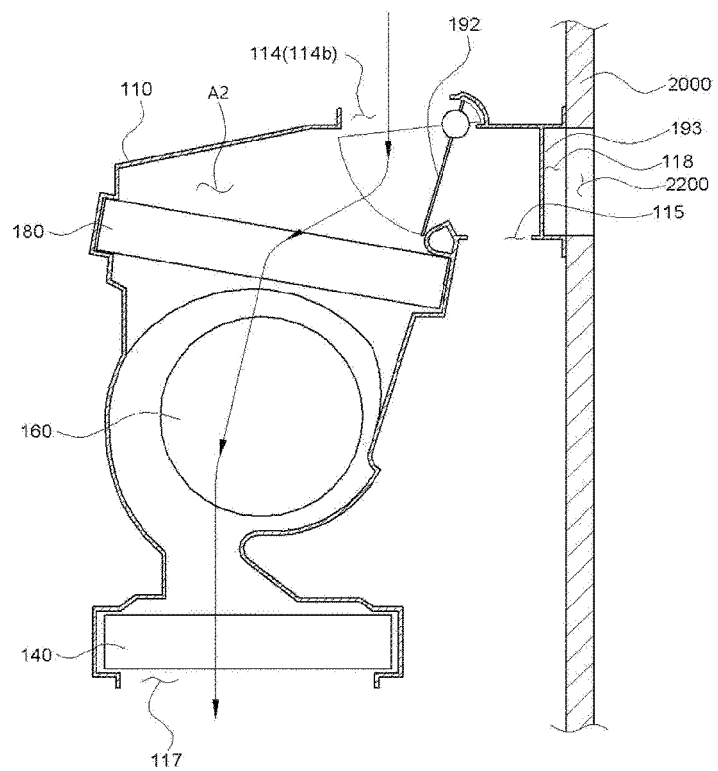
Figure 10:
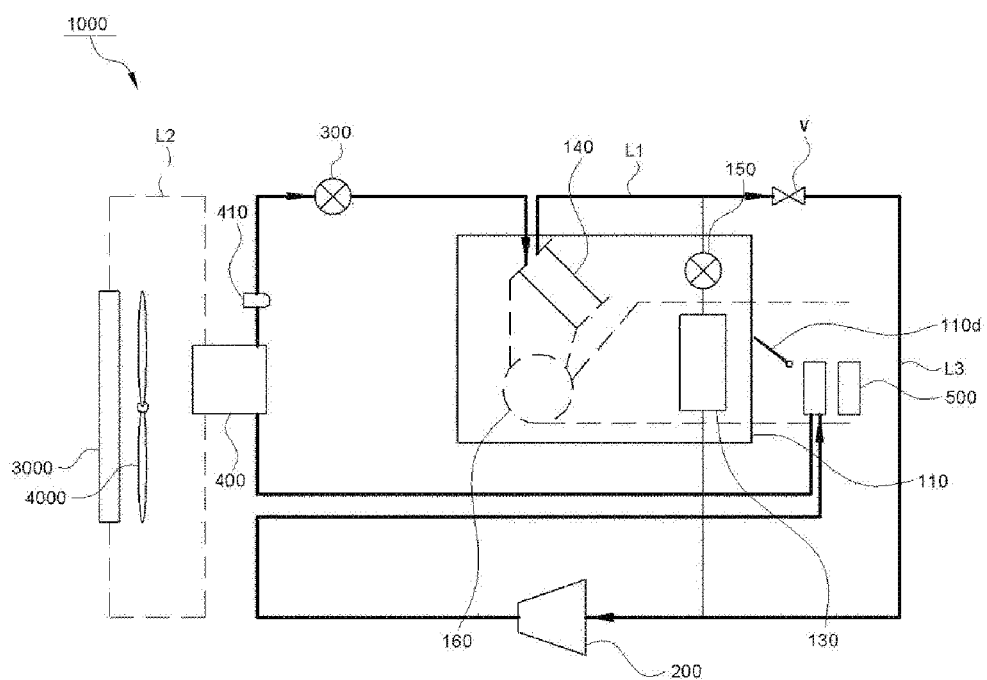
Figure 11:
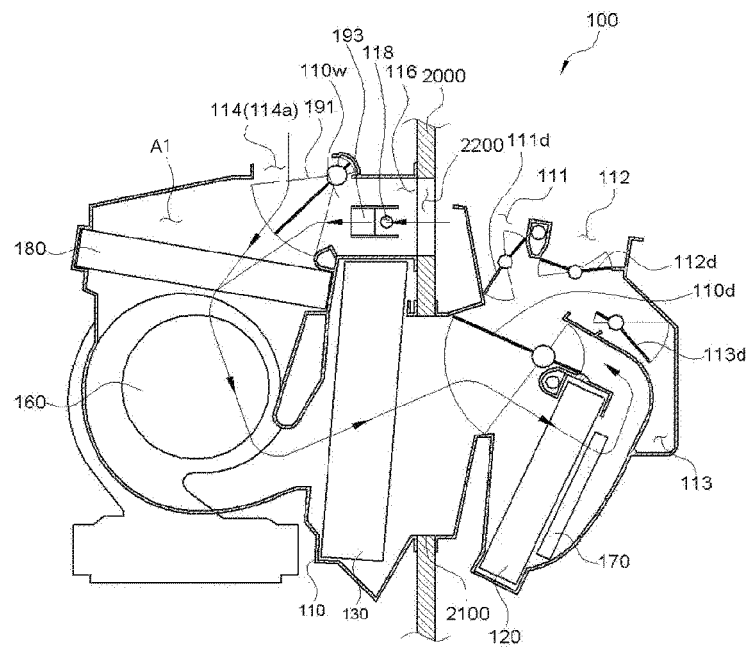
Figure 11:
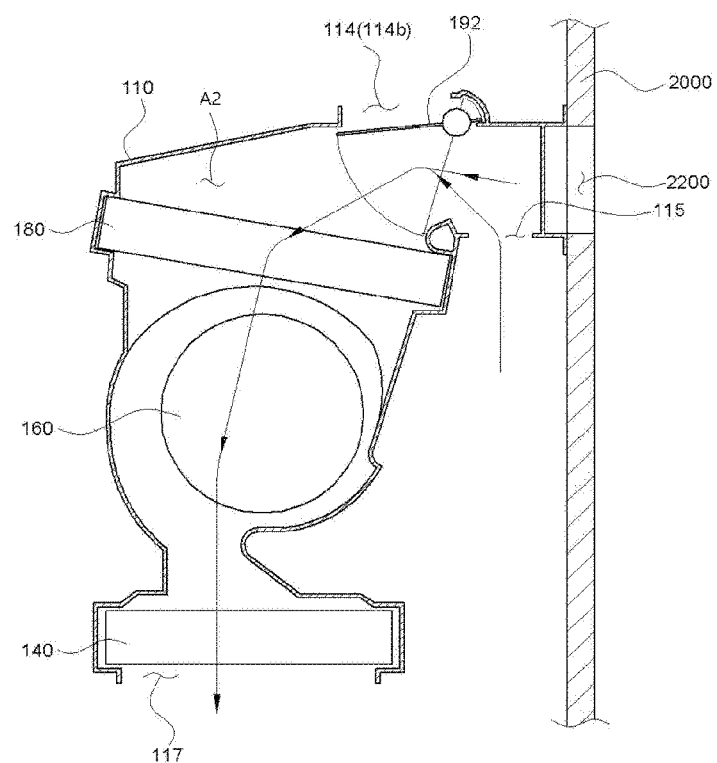
Figure 12:
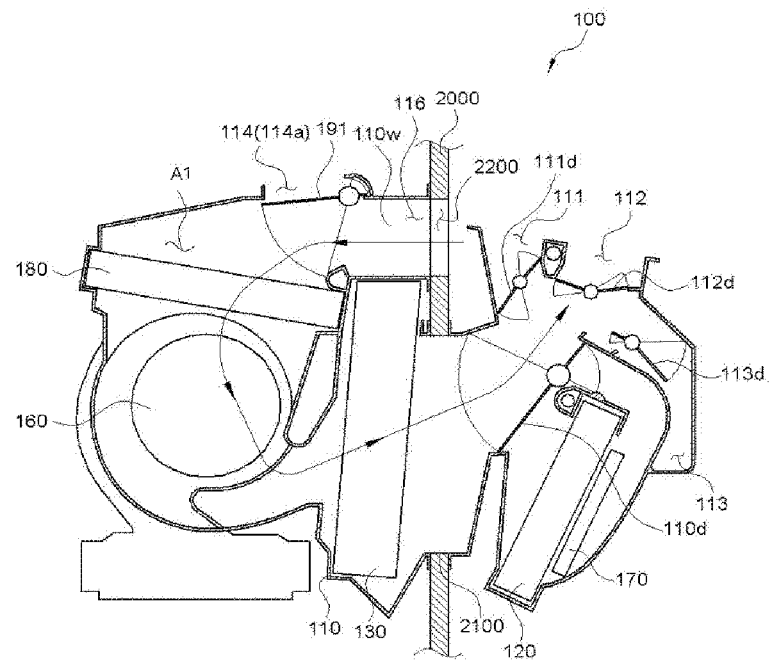
Figure 12:
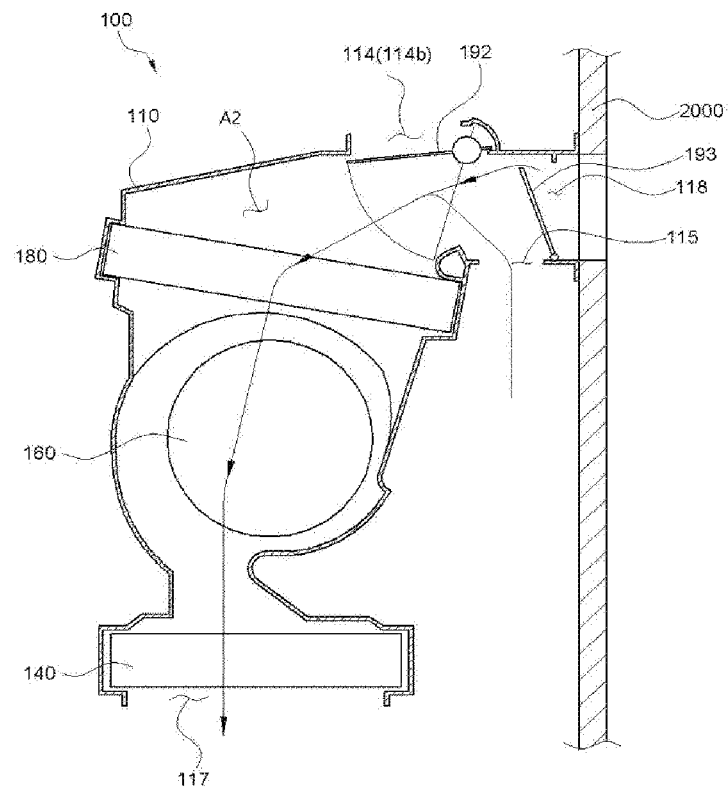

FIGS. 8, 9A, and 9B are views each showing a state in which the air conditioning apparatus for a vehicle cools air according to the present disclosure.

First, during the maximum heating, the refrigerant compressed by the compressor 200 may pass through the internal heat exchanger 120 without heat exchange (because the temp door 110*d* blocks the flow of air passing through the internal heat exchanger 120 in the first area A1), and the high-pressure refrigerant delivered from the compressor 200 may be condensed while passing through the water-cooled heat exchanger 140 and the heat exchanger 140. Here, the first expansion member 300 may bypass the refrigerant. The condensed refrigerant may be throttled in the second expansion member 150 and supplied to the evaporator 130, and heat may be exchanged between the low-pressure liquid refrigerant throttled in the evaporator 130 and the air passing through the first area A1. Therefore, air discharged to the inside may be cooled by heat absorption by the evaporative latent heat of the refrigerant.

Here, in order to increase cooling efficiency, the first adjusting door 191 may close the first outside-air inlet 114*a* and open the inside-air inlet 116, and the inside air may thus be cooled by exchanging heat with the evaporator 130 while being introduced into and moved to the first area A1. The second adjusting door 192 may open the second outside-air inlet 114*b*, and the outside air may thus be discharged by exchanging heat with the heat exchanger 140 while being introduced into and moved to the second area A2.

Meanwhile, dehumidification cooling may be performed in the same state as the cooling state shown in FIGS. 8, 9A, and 9B, but may be performed by adjusting the temperature of air supplied to the inside of the vehicle by adjusting the temp door 110*d*.

FIGS. 10 through 12B are views each showing a state in which the air conditioning apparatus for a vehicle heats air according to the present disclosure.

First, during the maximum heating, the refrigerant compressed by the compressor 200 may exchange heat with the air passing through the first area A1 while passing through the internal heat exchanger 120, and may thus heat the air discharged to the inside due to the heat dissipation by its condensation. Meanwhile, the air introduced into the first area A1 may pass through the evaporator 130, the temp door may be operated to allow all the air to pass through the internal heat exchanger 120. Here, the air may pass through the evaporator 130 without heat exchange with the evaporator 130 in a state in which no refrigerant is supplied to the evaporator 130. The coolant does not flow along the coolant circulation line L2 in the water-cooled condenser 400 either, and the refrigerant may be moved without change. The refrigerant may be throttled in the first expansion member 300, supplied to the heat exchanger 140, and then evaporated. The refrigerant evaporated while passing through the heat exchanger 140 may be supplied to the compressor 200 through the bypass line L3 without passing through the second expansion member 150 or the evaporator 130.

Here, the first adjusting door 191 may selectively open the first outside-air inlet 114*a* or the inside-air inlet 116 to blow the air into the first area A1, and the second adjusting door 192 may close the second outside-air inlet 114*b* and open the engine room air inlet 115 to allow the air in the engine room to be introduced into the second area A2. In addition, the third adjusting door 193 may open the auxiliary inside-air inlet hole 118 to allow the inside air to be introduced thereinto. Here, FIGS. 11A, 11B, 12A, and 12B show cases in which different third adjusting doors 193 are formed, in which all the third adjusting doors 193 open the auxiliary inside air inlet hole 118.

Figure 13:
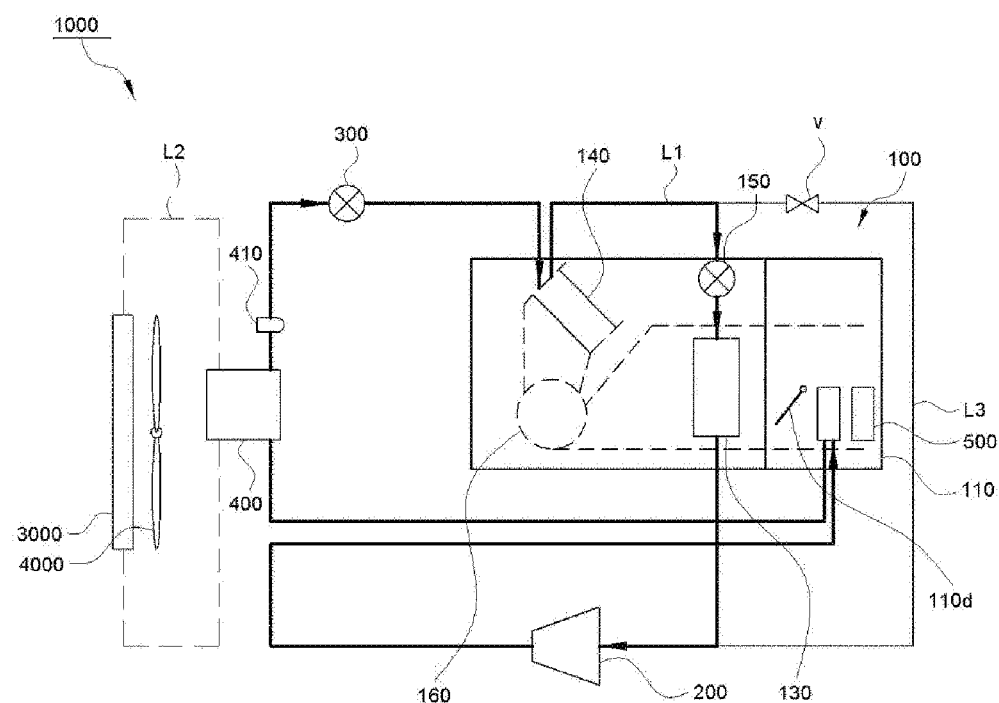
FIG. 13 is a view showing a state of the heat pump system while the air conditioning apparatus performs dehumidification heating according to the present disclosure.

Meanwhile, FIG. 13 is a view showing a state of the heat pump system 1000 while the air conditioning apparatus 100 performs dehumidification heating according to the present disclosure, which shows an example in which the air passing through the heat exchanger 140 does not pass through the bypass line L3 but may pass through the second expansion member 150 and the evaporator 130 to additionally absorbs heat, thereby adjusting dehumidification and temperature of the heat pump system.

In summary, the air conditioning apparatus 100 for a vehicle of the present disclosure may be the air conditioning apparatus 100 used for the heat pump system, that is, an air conditioning system which may perform the cooling and the heating using one refrigerant line. The heating may use the high-temperature refrigerant compressed by the compressor 200, and the cooling may use the evaporation of the refrigerant. Here, a chronic problem of the heat pump system, i.e. deteriorated condensing performance during the cooling may be solved by using the heat exchanger 140 condensing the refrigerant together with the internal heat exchanger 120. The heat exchanger 140 may be mounted in the air conditioning case 110, and condense the refrigerant by receiving the wind from the blower 160 generating the air conditioning wind. That is, the heat exchanger 140 does not have a separate fan or blower blowing the air, and may receive the wind from the blower 160 generating the air conditioning wind, thereby reducing the overall size of the vehicle.

In addition, the air conditioning apparatus 100 for a vehicle of the present disclosure may be formed in a structure in which the air discharged from the second area B2 is not introduced back into the second area B2. During the heating, air discharged to the air outlet 117 by passing through the heat exchanger 140 of the second area B2 may exchange heat with the heat exchanger 140 to have a lower temperature than the air in the engine room. Accordingly, if the air discharged from the second area B2 is again supplied to the second area B2 through the engine room air inlet 115, it is difficult to fully enhance the heating performance by introducing the high temperature air of the engine room. In order to solve this problem, the air conditioning apparatus 100 for a vehicle of the present disclosure may have a structure in which air discharged from the second area B2 is not introduced back into the second area B2, and may have various forms.

Figure 14:
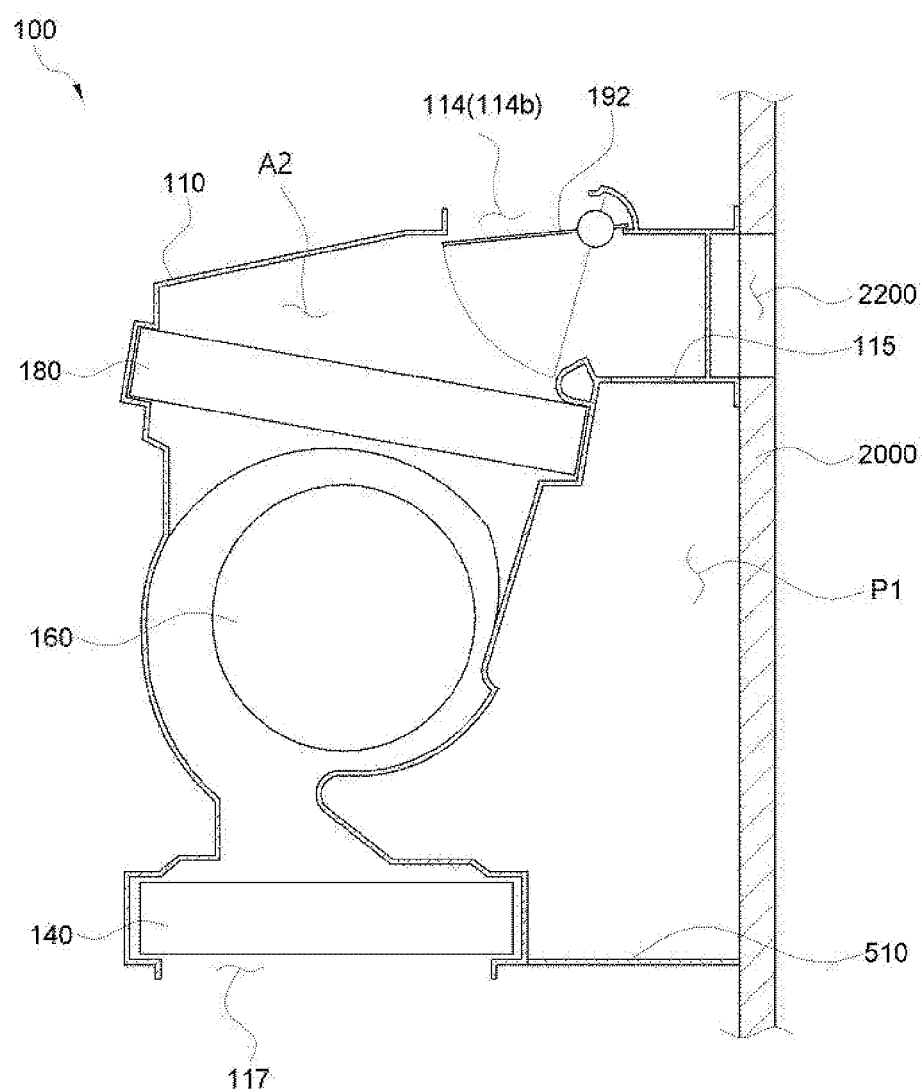
FIG. 14 is a cross-sectional view showing another example of the air conditioning apparatus according to the present disclosure.
Figure 15:
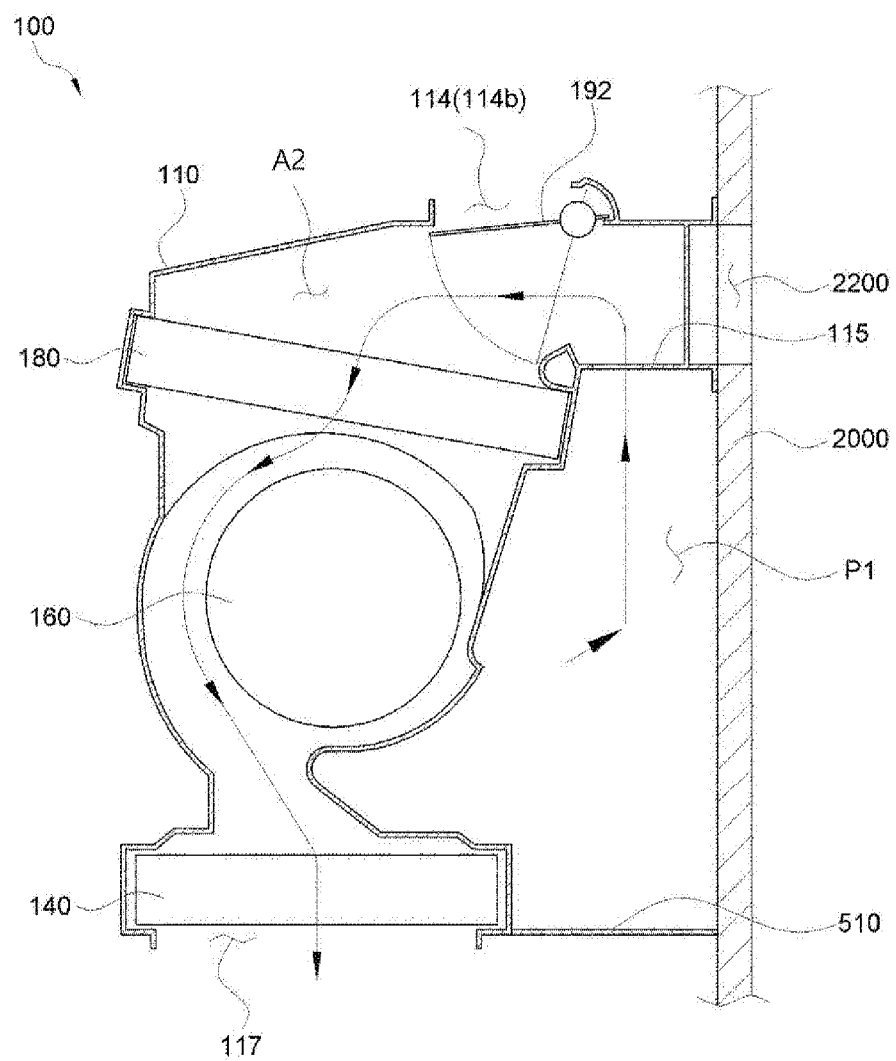
FIG. 15 is a view showing an air flow in a second area of the cross-sectional view shown in FIG. 14.

First, FIGS. 14 and 15 each show an example in which a blocking plate 510 blocking the air flow in a height direction is formed by connecting between the air outlet 117 of the air conditioning case 110 and the dash panel 2000. That is, the blocking plate 510 may block the air discharged through the air outlet 117 from being moved to an engine room air inlet passage P1.

Figure 16:
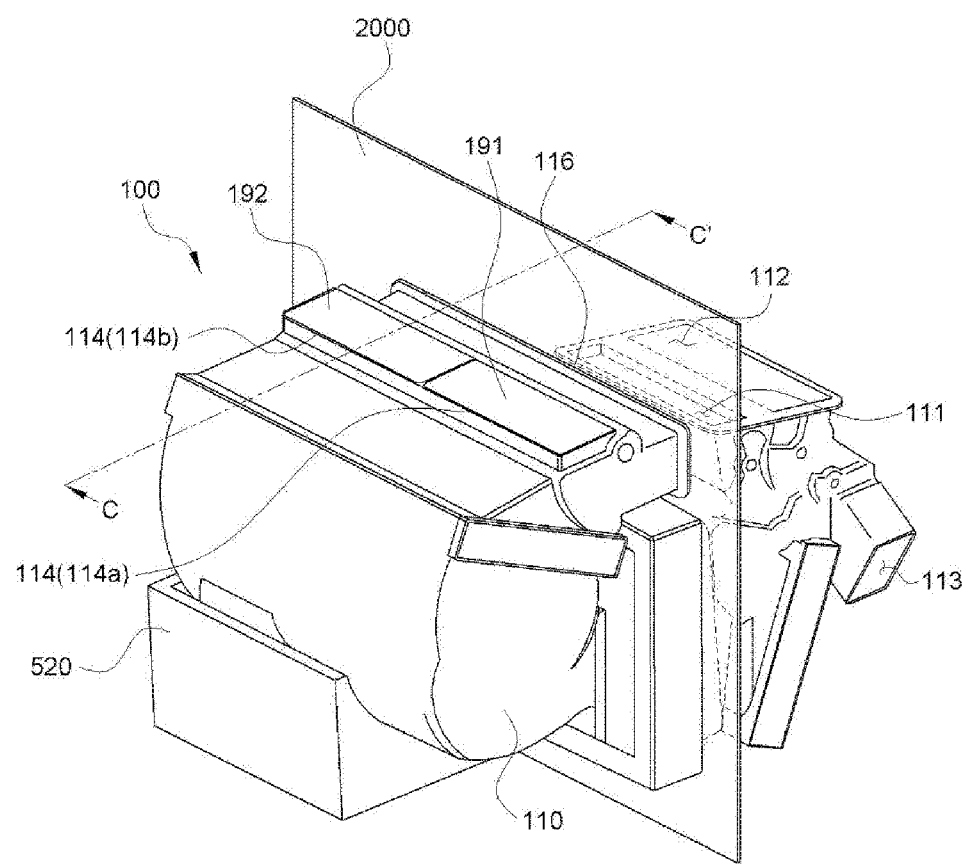
FIGS. 16 and 17 are a perspective view and a cross-sectional view in direction CC' each showing another example of the air conditioning apparatus for a vehicle according to the present disclosure.
Figure 17:
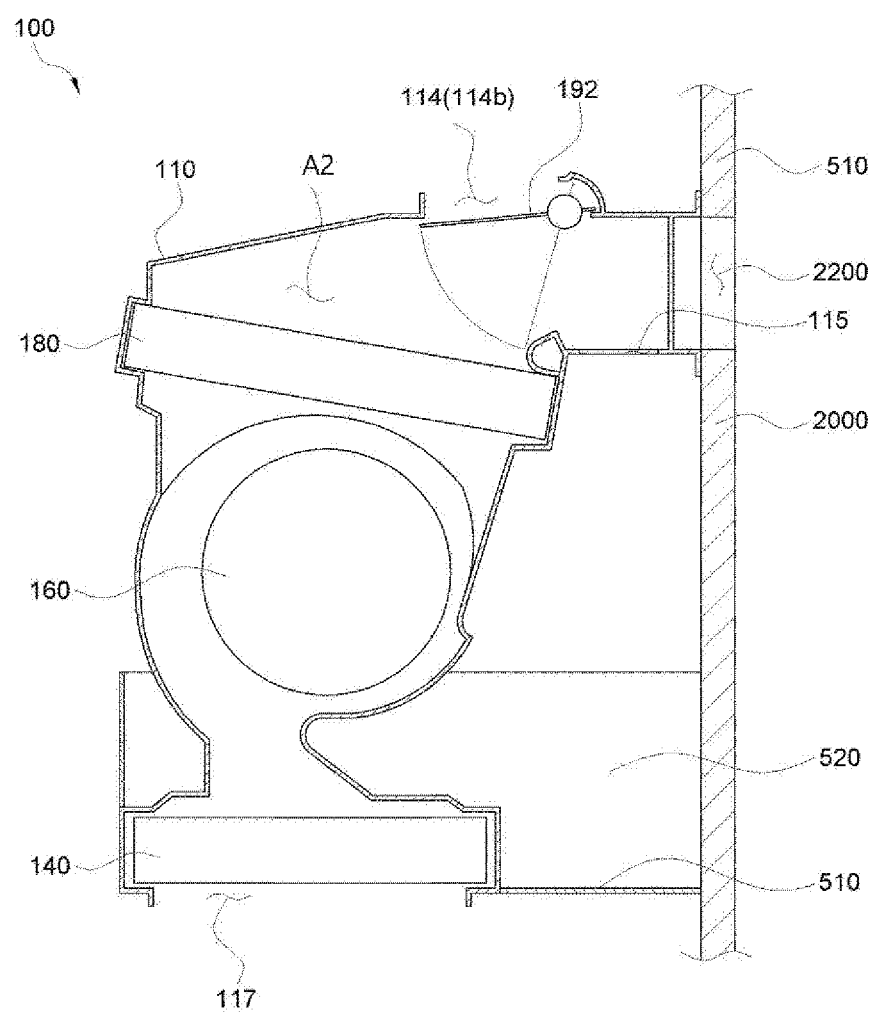
Figure 18:
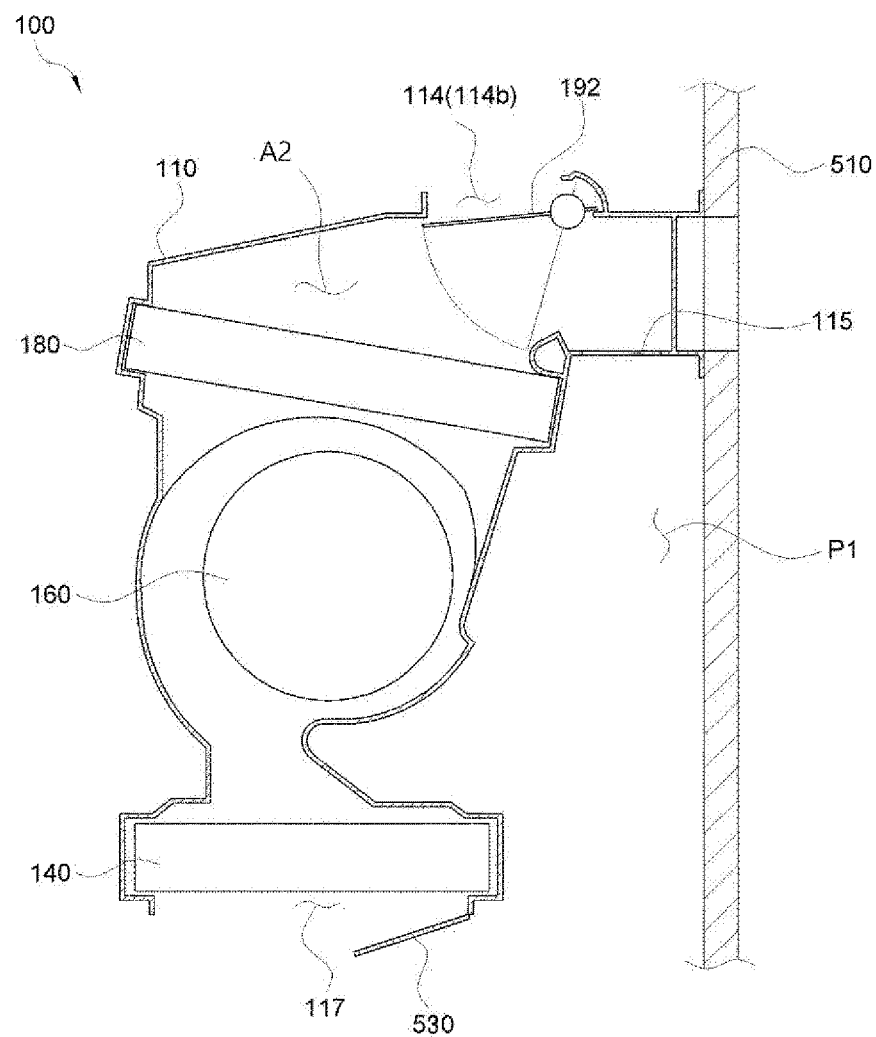
FIGS. 18 and 19 are views each showing another example and an air flow in the air conditioning apparatus for a vehicle according to the present disclosure.
Figure 19:
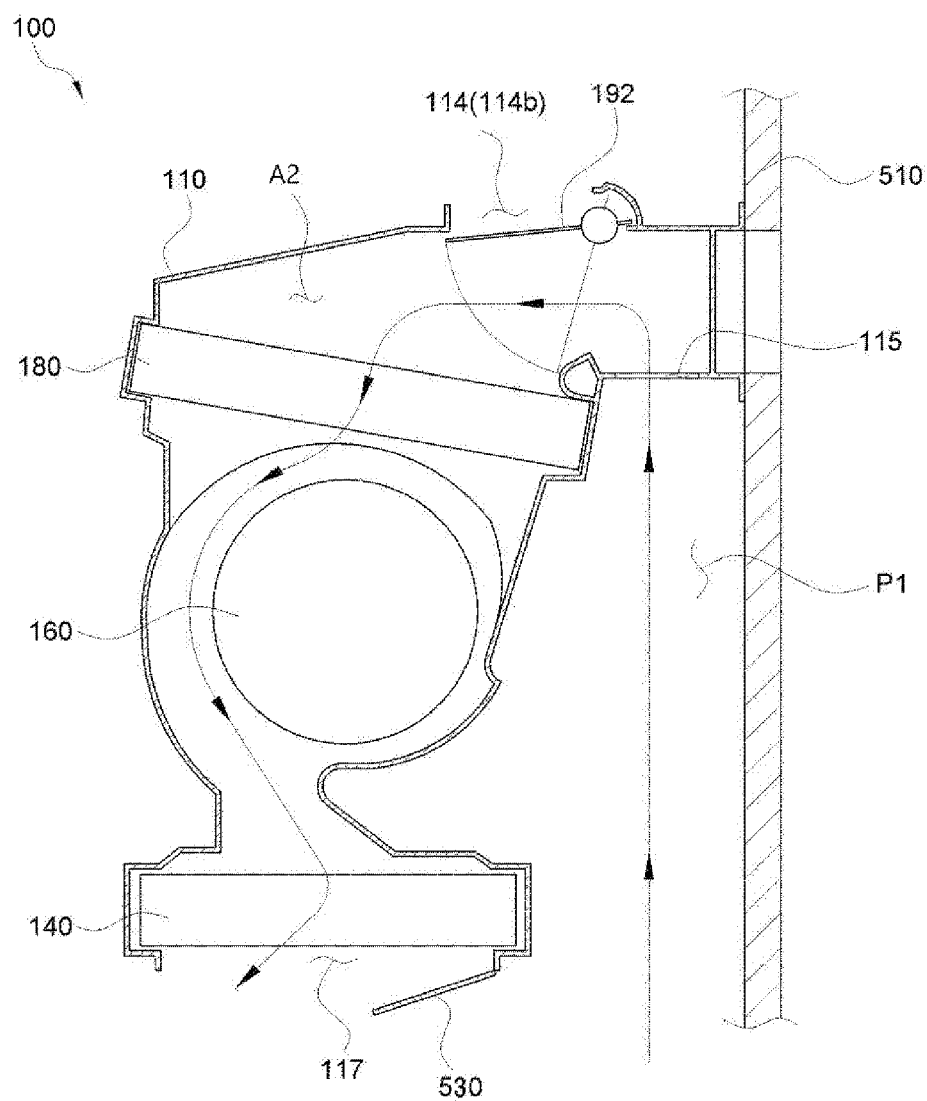

FIGS. 16 and 17 are a perspective view and a cross-sectional view in direction CC' each showing another example of the air conditioning apparatus 100 for a vehicle according to the present disclosure; FIGS. 18 and 19 are views each showing another example and an air flow in the air conditioning apparatus for a vehicle according to the present disclosure; and FIG. 20 is a view showing another example of the air conditioning apparatus 100 for a vehicle according to the present disclosure.

First, FIGS. 16 and 17 each show that an extension portion 520 is additionally formed by extending a periphery of the blocking plate 510 in an upward direction to surround the air outlet 117.

In addition, FIGS. 18 and 19 show an example in which a guide portion 530 is formed on a portion of the air outlet 117, which is adjacent to the dash panel 2000, to guide the air discharged through the air outlet 117 in a direction away from the dash panel 2000.

Figure 20:
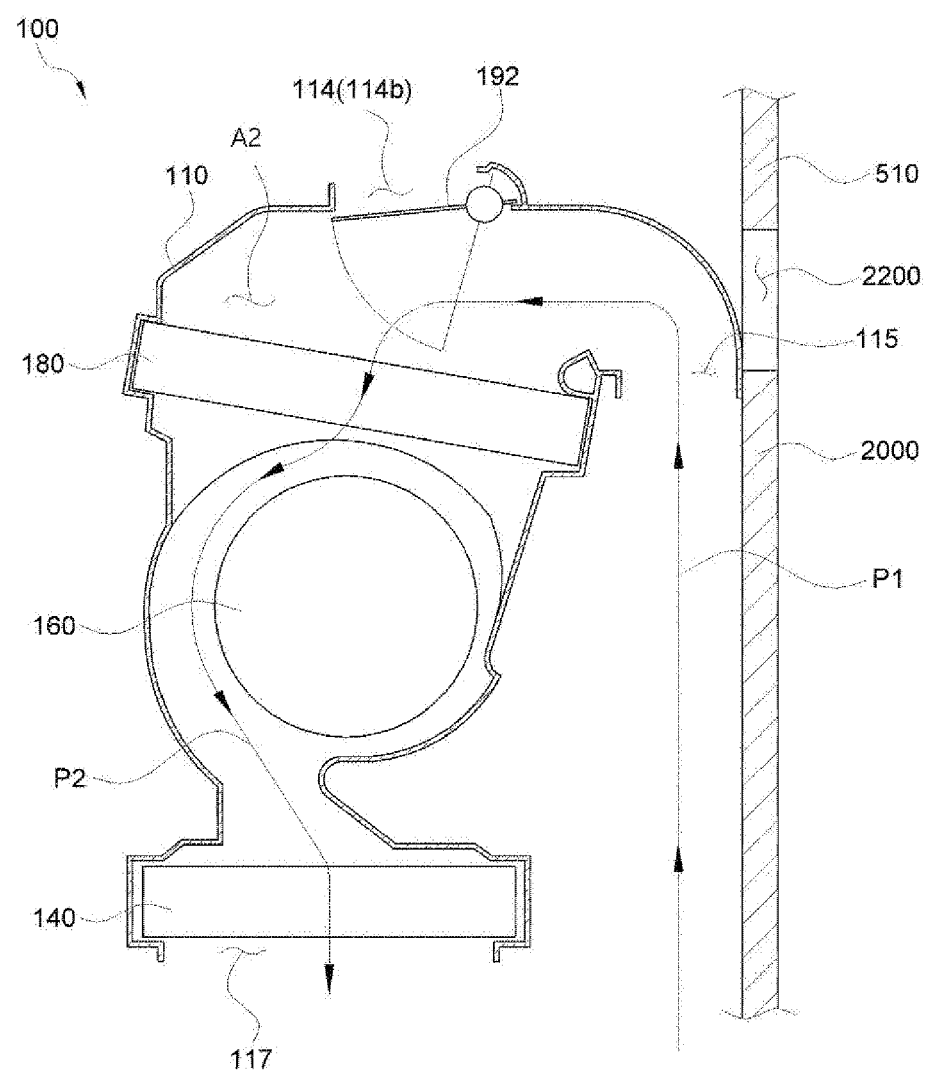
FIG. 20 is a view showing another example of the air conditioning apparatus for a vehicle according to the present disclosure.

In addition, FIG. 20 shows an example in which an inner passage P2 of the second area 100B, which is a space in the second area 100B, and the engine room air inlet passage P1 are formed to be parallel to each other. In more detail, in the air conditioning case 110, the second outside-air inlet 114b disposed above the second area A2, and the air outlet 117 disposed therebelow, may be respectively disposed at the upper and lower sides in the height direction. That is, the second outside-air inlet 114b may be disposed in an area upwardly extending from an area where the air outlet 117 is formed.

The air conditioning apparatus 100 for a vehicle of the present disclosure, which has such a configuration, may allow the air in the engine room, having a high temperature, to be supplied to the second area A2 through the engine room air inlet 115, thereby sufficiently securing its heating performance.

The air conditioning apparatus 100 for a vehicle of the present disclosure may be formed in the shapes shown in FIGS. 2 through 20, and may be formed in more various shapes as long as the apparatus has a structure in which the air discharged from the second area A2 is prevented from being introduced back to the engine room air inlet 115 of the second area A2.

The present disclosure is not limited to the above-mentioned embodiments, and may be variously applied. In addition, the present disclosure may be variously modified by those skilled in the art to which the present disclosure pertains without departing from the gist of the present disclosure claimed in the claims.

The invention claimed is:

1. An air conditioning apparatus for a vehicle, comprising:
   an air conditioning case including a first area which communicates with the inside of the vehicle and in which inside-air conditioning wind flows and a second area which communicates with the outside of the vehicle;
   a blower which blows the wind to the first area and the second area; and
   an auxiliary inside-air inlet hole formed by hollowing out a region to allow internal air to enter the second region, and abutting a third adjustable door, the opening and closing of which is controlled by said third adjustable door, and the auxiliary inside-air inlet hole is adjacent to an inside-air inlet and is formed by hollowing out a portion of a partition wall, which is a partition wall separating a first area and a second area, and moving a portion of the air entering the first area through said inside-air inlet to the second area via said auxiliary inside-air inlet, wherein the air entering the second area is not cooled and heated and is discharged to the outside of the vehicle.

2. The air conditioning apparatus for a vehicle of claim 1, wherein the blower is a blower operated by one motor, and the wind is blown to the first area and the second area by the blower.

3. The air conditioning apparatus for a vehicle of claim 1, comprising an evaporator for a cooling and an internal heat exchanger for a heating in the first area of the air conditioning case.

4. The air conditioning apparatus for a vehicle of claim 3, comprising a heat exchanger installed in the second area of the air conditioning case to condense a refrigerant during the cooling and to evaporate the refrigerant during the heating.

5. The air conditioning apparatus for a vehicle of claim 4, wherein when wind passing through the first area is cold wind for the cooling, wind passing through the second area is wind having a higher temperature than the cold wind.

6. The air conditioning apparatus for a vehicle of claim 5, wherein when the wind passing through the first area is warm wind for the heating, the wind passing through the second area is wind having a lower temperature than the warm wind.

7. The air conditioning apparatus for a vehicle of claim 6, wherein outside air or air in an engine room is selectively introduced into the second area.

8. The air conditioning apparatus for a vehicle of claim 7, wherein the air conditioning case includes:
   a first outside-air inlet into which outside air is introduced and an inside-air inlet into which inside air is introduced, each of which is formed by making a certain area of the air conditioning case hollow;
   a first adjusting door adjusting openings and closings of the first outside-air inlet and the inside-air inlet;
   a second outside-air inlet which is formed in the second area of the air conditioning case and into which the outside air is introduced; and
   a second adjusting door adjusting opening and closing of the second outside-air inlet.

9. The air conditioning apparatus for a vehicle of claim 8, wherein the air conditioning case includes an engine room air inlet which is formed by making a certain area hollow to allow the air in the engine room to be introduced into the second area, and opening and closing of which is adjusted by the second adjusting door.

10. The air conditioning apparatus for a vehicle of claim 9, wherein based on a dash panel partitioning the inside of the vehicle and the engine room from each other, the evaporator, the heat exchanger and the blower are installed in the engine room side in the air conditioning case.

11. The air conditioning apparatus for a vehicle of claim 10, wherein in the air conditioning case, a portion into which the air is introduced extends to correspond to an inside-air introduction hollow portion of the dash panel, which is made hollow to introduce the inside air thereinto, and the first outside-air inlet and the second outside-air inlet are formed on an upper side of the extending portion, and the engine room air inlet is formed on a lower side of the extending portion.

12. The air conditioning apparatus for a vehicle of claim 10, wherein an air outlet through which air in the second area is discharged to the outside is formed in the air conditioning case, and the heat exchanger is installed adjacent to the air outlet installed behind the blower in the air flow direction.

13. The air conditioning apparatus for a vehicle of claim 12, wherein the air discharged from the second area is not introduced back into the second area.

14. The air conditioning apparatus for a vehicle of claim 13, wherein a blocking plate blocking an air flow in a height direction is formed by connecting between the air outlet of the air conditioning case and the dash panel.

15. The air conditioning apparatus for a vehicle of claim 14, wherein an extension portion is additionally formed by extending a periphery of the blocking plate in an upward direction.

16. The air conditioning apparatus for a vehicle of claim 13, wherein a guide portion is formed on a portion of the air outlet, which is adjacent to the dash panel, to guide the air discharged through the air outlet in a direction away from the dash panel.

17. The air conditioning apparatus for a vehicle of claim 13, wherein the second outside-air inlet and the air outlet are respectively disposed at the upper and lower sides in the height direction, thereby forming an engine room air inlet passage, which is a space through which the air in the engine room between the air conditioning case and the dash panel is moved to the engine room air inlet, and an inner passage of the second area, which is a space in the second area, to be parallel to each other.

18. The air conditioning apparatus for a vehicle of claim 8, wherein the air conditioning case further includes a filter installed behind the first adjusting door and the second adjusting door in an air flow direction.

19. The air conditioning apparatus for a vehicle of claim 4, further comprising an auxiliary heating heat exchanger installed behind the internal heat exchanger in the air flow direction.

20. The air conditioning apparatus for a vehicle of claim 1, wherein the third adjusting door has the shape of a sliding door.

21. The air conditioning apparatus for a vehicle of claim 1, wherein during maximum heating, the second adjusting door blocks the second outside-air inlet and opens the engine room air inlet to introduce the air in the engine room, and the third adjusting door opens the auxiliary inside-air inlet hole to introduce some of the inside air.

\* \* \* \* \*